June 11, 1929.　　W. W. HOOVER ET AL　　1,717,154
ELECTRICAL CONDENSER
Filed June 23, 1924
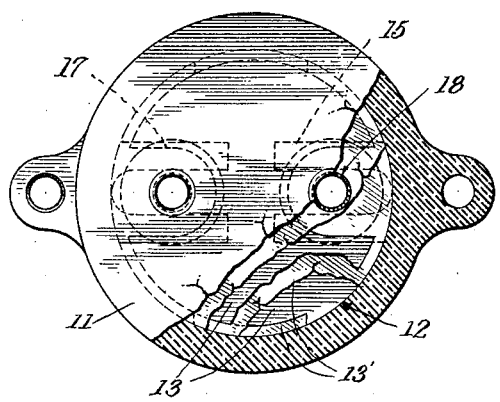
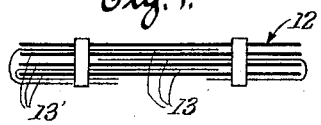
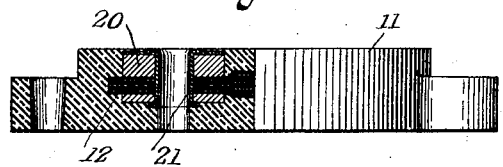
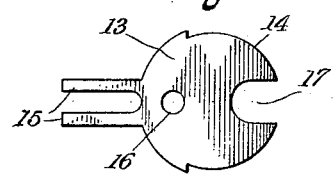
INVENTORS
Maxwell E. Sparrow
Wilson W. Hoover
BY
Hoover & Sparrow
ATTORNEYS Patented June 11, 1929.

1,717,154

UNITED STATES PATENT OFFICE.

WILSON W. HOOVER AND MAXWELL E. SPARROW, OF NEW YORK, N. Y.

ELECTRICAL CONDENSER.

Application filed June 23, 1924. Serial No. 721,703.

We have invented an improved fixed condenser for radio and other appropriate circuits.

Our invention relates to that class in which the electric and dielectric elements are hermetically sealed in a suitable material and contact between the elements permanently maintained under high pressure.

Our invention includes both a process and an article of manufacture.

In the present state of the art a previously arranged stack of elements of a fixed condenser is not so moulded and embedded within a plastic material as to form, when completed, an integral part of the moulded mass, hermetically sealed therein so the air cannot penetrate such mass.

Fixed condensers as now constructed are exposed to atmospheric or weather changes and their capacitance varies therewith.

Among other objects of our invention is to produce a condenser, in which the elements thereof shall be hermetically sealed under a heavy pressure within a suitable non-porous dielectric material, impermeable to air or moisture, so that the elements shall be completely embedded within such mass and become an integral part thereof. Also to maintain such a high pressure while moulding the mass with the elements contained therein, that, when the material cools and sets or is cured, such pressure shall be maintained by the material upon the contained elements therein, so as to maintain an intimate and uniform contact between the dielectrics and the metallic plates throughout their contiguous surfaces, to the end that the cross section between the metal plates shall be uniform in thickness at all points, and by the use of sheet mica, or an equally suitable dielectric of uniform thickness, and of a suitable sheet metal, as copper of uniform thickness, to secure uniform cross sections at all points when the elements have been positioned under pressure.

We have found by experiment that when a dielectric such as mica, and a metallic element such as copper or brass, of suitable and uniform thickness, and cross section, are completely embedded within a suitable dielectric, plastic material by moulding the same therein and for that purpose applying a high pressure of about 3000 pounds per square inch or upwards and continuing such pressure until the moulded material shall have set and hardened, we can thus produce a constant high pressure contact between the elements of the condenser substantially equal to the static force applied to produce the same, and as a result we can obtain a potential capacity not subject to variation or change, in which the actual value is constant. Condensers of different capacities may be made by varying the thicknesses or cross section of the dielectric and area of the opposed metal elements, as is well known in the art.

We have also found that by imparting a circular contour to the assembled elements and to the mould we can develop the same potential energy in a more compact form than by the use of angular contours and are enabled to locate and bring out our terminal connections from the condenser plates near the center of the structure, making a much more compact and convenient commercial arrangement than the methods now commonly used with condensers of angular contour.

Having thus generally described some of the features and objects of our invention, we will more particularly describe the same by reference to the annexed drawing, in which similar reference characters indicate identical parts.

In the drawing, Figure 1 is a plan view of one embodiment of our invention, parts being broken away to show the interior construction.

Figure 2 is a partial side elevation and partial longitudinal sectional view of the device shown in Figure 1.

Figure 3 is a plan view of one of the condenser plate elements.

Figure 4 is a diagrammatic view showing the assembling of the condenser elements before moulding.

Referring to the annexed drawing our invention consists generally of a housing 11 and insert 12 described fully hereinbelow.

Insert 12 is made up of metallic elements 13 preferably as shown in Figure 3 and dielectric elements 13′. These metallic elements have a general circular contour offset at 14 and provided with a bifurcated tongue portion 15. At spaced distances from the center there are provided circular apertures 16 and recesses 17 the latter having a radius greater than that of the former.

Dielectric element 13′ is preferably made of pure mica having a diameter coincident with the diameter of the body portions 13 of metallic element and is provided with perforation or hole 18 which registers with hole 16 and recess 17 of said metallic element.

Insert 12 is constructed by interposing dielectric elements 13' between oppositely positioned metallic elements 13. In order to provide a rigid structure, reinforced dielectric elements similar to 13' are superimposed upon both outer surfaces of metallic elements 13. The bifurcated tongues 15 are folded over as shown diagrammatically in Figure 4.

Registering with the perforations 16, 17 and 18 in the dielectric and metallic elements are the openings of the washers 20, which are positioned preferably on the surface of the stack opposite that upon which the bifurcated positions 15 of metallic elements 13 are folded.

The entire structure is secured together by means of eyelets, or tubular rivets 21.

The purpose of washers 20 is to provide terminals flush with the surface of the housing.

The metallic elements are so assembled that they present a staggered relation of the offset portions and prevent the body portions from registering at any point with an adjacent plate and thus prevent any leakage.

We preferably use mica discs for our dielectric elements and sheet copper for our metallic element though any other suitable material may be substituted therefor.

We also preferably use bakelite or a preparation of shellac having a standard dielectric value, as fixed by the Bureau of Standards for a plastic medium within which to embed our elements when moulding the same.

We also preferably use tubular electrodes for electrical contacts with the embedded elements.

We also preferably construct the elements and the moulded case with circular contours but do not confine ourselves to such preferable features as the same may, in each and all instances cited, be varied as desired without departing from the spirit of our invention.

Having thus shown and described the same we claim as novel and our invention:

1. A fixed condenser comprising in combination, a dielectric housing within which is hermetically sealed a condenser unit having a plurality of metallic plates separated by dielectric discs, the metallic plates having extending bifurcated tongues turned reentrantly to contact with electrodes passing through recesses and apertures in the metallic plates and extending to the surface of the housing.

2. A fixed condenser comprising in combination, a dielectric housing within which is hermetically sealed a condenser unit having a plurality of metallic plates separated by dielectric discs, the adjacent plates being in staggered relation and having extending bifurcated tongues turned reentrantly to contact with electrodes passing through recesses and apertures in the metallic plates and extending to the surface of the housing.

3. In a fixed condenser the combination with a stack of alternate layers of mica dielectrics and metallic plates, said metallic plates being perforated and stamped in substantially the geometric form of two adjoining segments of unlike size joined at their chords with the chordal centers coincident, of a moulded casing completely enveloping the assembled stack, said casing being adapted on setting to maintain the stack under pressure imparted to the stack during the moulding operation.

4. A fixed condenser comprising a stack of alternate layers of mica dielectrics and metallic plates, said metallic plates being perforated and stamped in substantially the geometric form of two adjoining segments of unlike size, and a molded casing completely enveloping the assembled stack.

5. A fixed condenser comprising a stack of alternate layers of mica dielectrics and metallic plates, said metallic plates being perforated and stamped in substantially the geometric form of two adjoining segments of unlike size, joined at their chords with the chorded centers coincident, and a moulded casing completely enveloping the assembled stack.

Signed at New York in the county of New York and State of New York this 31st day of May, 1924.

WILSON W. HOOVER.
MAXWELL E. SPARROW.